United States Patent [19]
Ramanujam

[11] Patent Number: 5,707,695
[45] Date of Patent: Jan. 13, 1998

[54] BILAMINATE WINDOW GLASS ASSEMBLY

[75] Inventor: Narayanan Ramanujam, Canton, Mich.

[73] Assignee: Ford Global Technologies, Inc., Dearborn, Mich.

[21] Appl. No.: 334,009

[22] Filed: Oct. 31, 1994

[51] Int. Cl.$^6$ ............................................. E06B 7/00
[52] U.S. Cl. .................... 428/14; 49/502; 428/122; 428/358
[58] Field of Search ................. 428/14, 122, 358; 49/502

[56] References Cited

U.S. PATENT DOCUMENTS

| | | | |
|---|---|---|---|
| 2,552,955 | 5/1951 | Gaiser et al. | 428/34 X |
| 3,282,722 | 11/1966 | Hailstone | 428/409 |
| 3,425,176 | 2/1969 | Cairns | 52/208 |
| 3,836,193 | 9/1974 | Donahoe | 428/38 X |
| 4,072,779 | 2/1978 | Knox et al. | 428/220 |
| 4,469,743 | 9/1984 | Hiss | 428/215 |
| 4,480,417 | 11/1984 | Evers | 428/122 X |
| 4,949,509 | 8/1990 | Gold | 428/122 X |
| 5,169,694 | 12/1992 | Endo et al. | 428/34 |
| 5,198,304 | 3/1993 | Kramling et al. | 428/437 |

*Primary Examiner*—Henry F. Epstein
*Attorney, Agent, or Firm*—Lorraine S. Melotik, Esq.; Roger L. May, Esq.

[57] ABSTRACT

A bilaminate window glass assembly for an automotive vehicle includes at least one pane forming a window glass, a non-breakable frame disposed adjacent about at least a portion of a perimeter of the pane and a panel bonded to one side of the frame and the pane to form a bilaminate window glass.

9 Claims, 2 Drawing Sheets

BILAMINATE WINDOW GLASS ASSEMBLY

BACKGROUND OF THE INVENTION

1. Field of the Invention

The present invention relates generally to window glass assemblies for automotive vehicles and, more specifically, to a bilaminate window glass assembly for an automotive vehicle.

2. Description of the Related Art

It is known to construct a window glass assembly for doors on a vehicle such as an automotive vehicle. Typically, the window glass assembly includes a pane of tempered glass for a window opening of the door on the automotive vehicle. The pane of tempered glass is disposed in a space between inner and outer panels of the door and attached to a door window regulator mechanism for moving the pane of tempered glass up and down. When in a fully up position, the pane of tempered glass allows an occupant to visually view objects through the window opening of the door. Upon an impact with an object, the pane of tempered glass typically shatters into many pieces.

Although tempered glass has worked well for the window glass assembly, it suffers from the disadvantage that, upon an impact, the shattered glass pieces may not remain in place in the window opening of the door.

SUMMARY OF THE INVENTION

Accordingly, the present invention is a bilaminate window glass assembly for an automotive vehicle including at least one pane of a window glass. The bilaminate window glass assembly also includes a non-breakable frame disposed adjacent about at least a portion of a perimeter of the pane and a panel bonded to one side of the frame and the pane to form a bilaminate window glass.

One feature of the present invention is that a bilaminate window glass assembly is provided for an automotive vehicle. Another feature of the present invention is that the bilaminate window glass assembly is provided for a door of the automotive vehicle. Yet another feature of the present invention is that the bilaminate window glass assembly is also provided for either a moveable or fixed window glass of the door. Still another feature of the present invention is that the bilaminate window glass assembly, when impacted, helps to retain shattered glass pieces in the window opening of the door.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
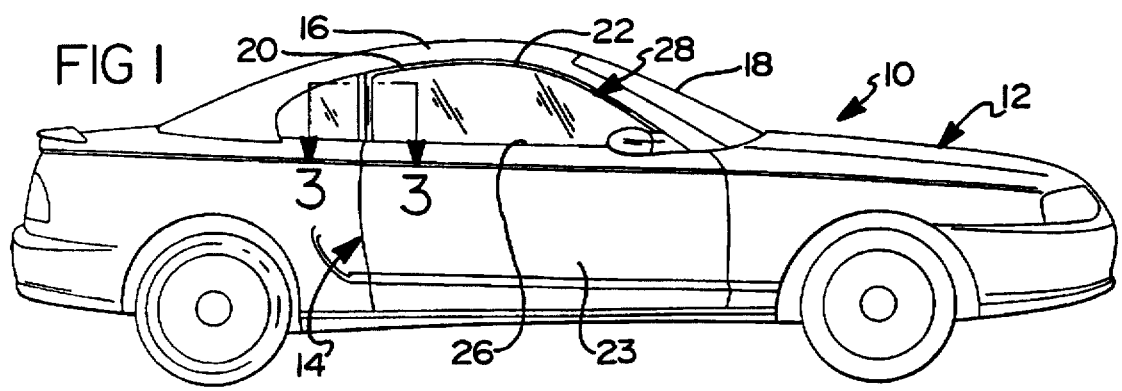
FIG. 1 is an elevational view of a bilaminate window glass assembly, according to the present invention, illustrated in operational relationship with an automotive vehicle.

Referring to the drawings and in particular to FIG. 1, one embodiment of a vehicle 10 such as an automotive vehicle includes a vehicle body, generally indicated at 12, and a vehicle door, generally indicated at 14, pivotally attached to the vehicle body 12 by suitable means such as hinges (not shown). The vehicle body 12 includes a roof 16 and a front windshield 18. The roof 16 has a roof rail 20 which forms a door opening and a portion of a window opening 22 for the vehicle door 14.

Figure 3:
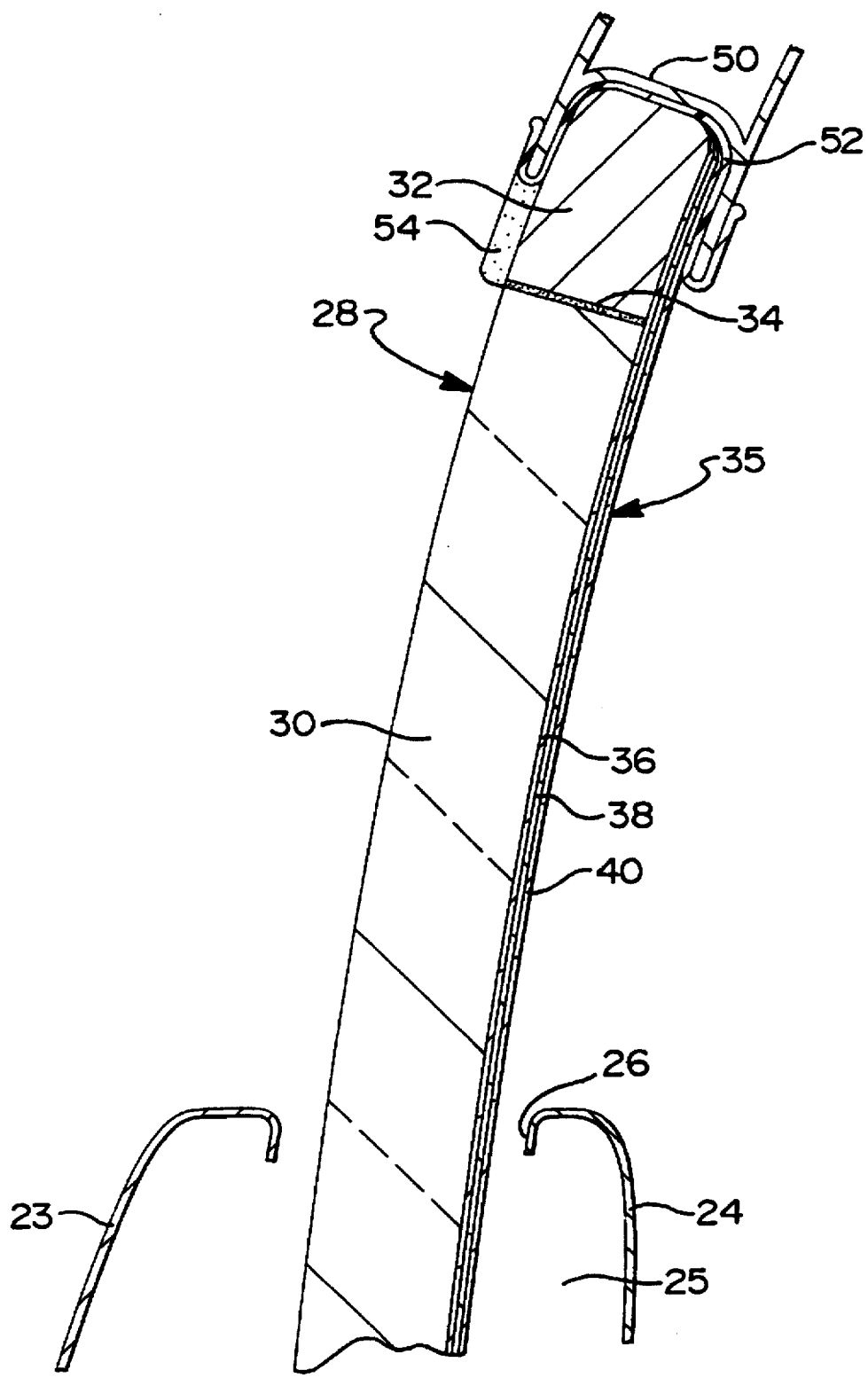
FIG. 3 is a sectional view taken along line 3—3 of FIG. 1.

Referring to FIGS. 1 and 3, one embodiment of the vehicle door 14 includes an outer panel 23 and an inner panel 24 joined together and forming a space 25 therebetween. The vehicle door 14 also includes an aperture 26 at about its middle thereof. The vehicle door 14 includes a bilaminate window glass assembly, according to the present invention and generally indicated at 28, for movement in and out of the space 25 and through the aperture 26. The vehicle door 14 also includes a door window regulator mechanism (not shown) for raising and lowering a bilaminate window glass to be described.

Figure 2:
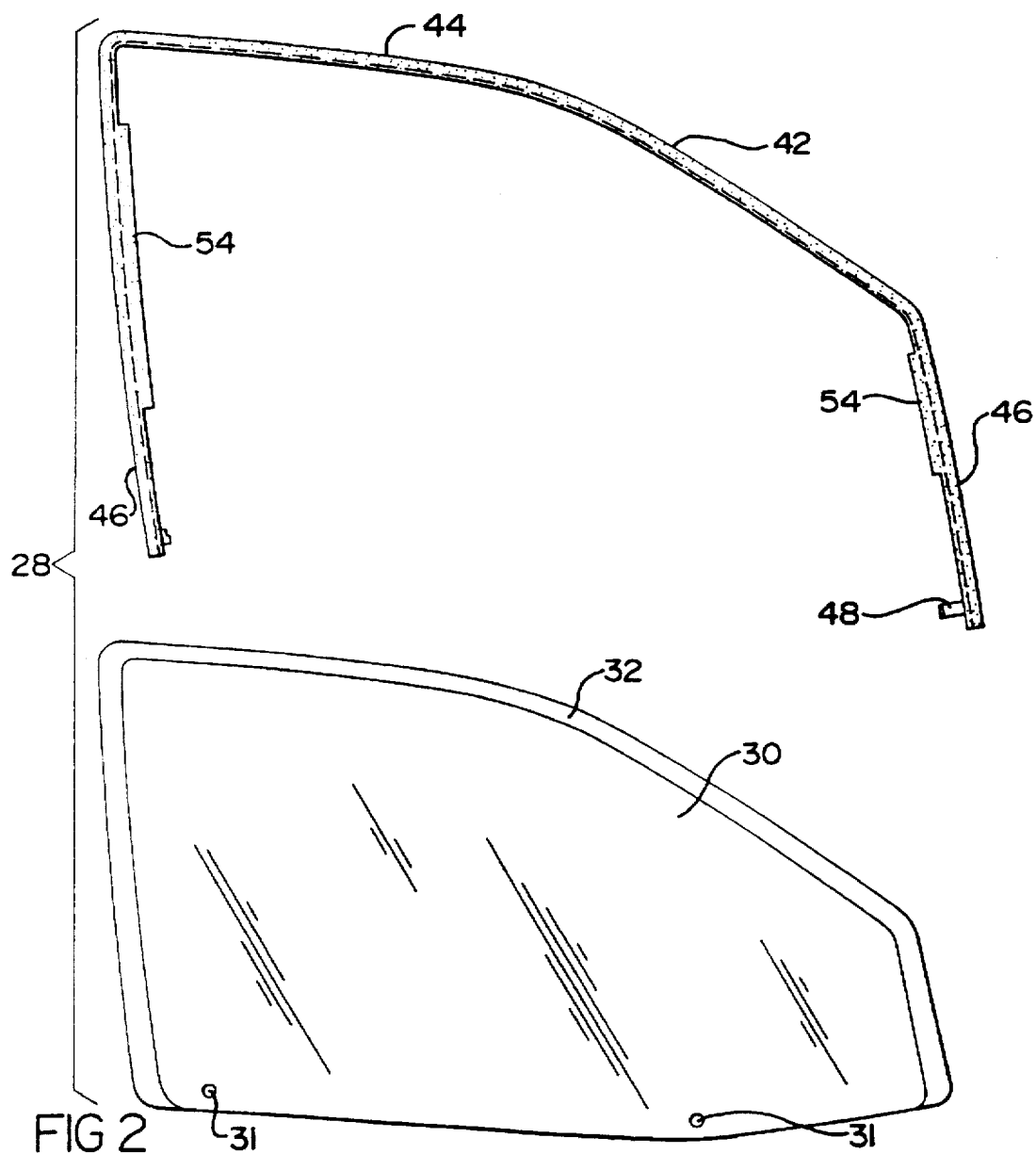
FIG. 2 is an exploded view of the bilaminate window glass assembly of FIG. 1.

Referring to FIGS. 2 and 3, one embodiment of the bilaminate window glass assembly 28 includes at least one pane 30 of a window glass. The window glass is a transparent material, for example, such as a tempered glass as is known in the art. The pane 30 may be current production window glass that is trimmed approximately one (1) inch along top and sides thereof. The pane 30 has a pair of holes 31 spaced along a bottom thereof for attachment by fasteners (not shown) to the door window regulator mechanism as is known in the art. It should be appreciated that the pane 30 should be surrounded on at least three sides by a non-breakable frame 32 to be described.

The bilaminate window glass assembly 28 also includes a frame 32 disposed adjacent about a portion of a perimeter of the pane 30. The frame 32 extends along exposed edges of the sides and top of the pane 30. The frame 32 has a thickness substantially equal to the thickness of the pane 30. The frame 32 has a width of approximately one (1) inch, in this particular example, so that the window glass has the same dimension as current production window glass for the vehicle 10. The frame 32 is made of a nonbreakable material such as a metal or plastic. The metal may be a steel or aluminum. The frame 32 is bonded to the exposed edges of the pane 30 by a suitable adhesive such as a bonding cement 34.

The bilaminate window glass assembly 28 further includes a panel, generally indicated at 35, bonded to one side of the frame 32 and the pane 30. Preferably, the panel 35 has a film 36, for example, of polyvinyl butyral (PVB) with a thickness of approximately 0.030 inches adjacent the pane 30 and frame 32. The panel 35 also has a film 38, for example, of polyethylene terephthalate (PET) with a thickness of approximately 0.007 inches adjacent the film 36. The panel 35 may have a protective microfilm 40 of a scratch resistant material, for example, such as polysiloxane adjacent the film 38 to provide a scratch resistant coating to the bilaminate window glass. The panel 35 is bonded to the inner side of the pane 30 and frame 32 by autoclaving which is conventional and known in the art.

Preferably, the window opening 22 for the vehicle door 14 includes a glass run channel 42 for engaging the bilaminate window glass to form a seal therebetween. The channel 42 has a top 44 and sides 46 for engaging the frame 32 of the bilaminate window glass. The channel 42 is disposed in a recess of a door frame for the window opening 22 as is known in the art. The channel 42 has a bracket 48 near one end which is secured by a fastener (not shown) to a door inside as is known in the art. In one embodiment, the channel 42 has a core 50 forming a generally inverted "U" shape and is covered by a cover 52. Preferably, the core 50 is made of a sheet metal material having a thickness of approximately 0.062 inches to 0.073 inches. Preferably, the cover 52 is made of an elastomeric material. The channel 42 has an integral downstanding flange 54 on the outer portion of the core 50 to overlap the outer side of the frame 32 of the bilaminate window glass. The downstanding flange 54 is formed either continuous or at intervals along the sides and top of the channel 42 to prevent the bilaminate window glass from dislodging from the channel 42 and holds it in place, when impacted at elevated speed.

In operation, when the bilaminate window glass is in the fully up position and a head of an occupant impacts the bilaminate window glass at approximately twenty-five (25) M.P.H., the pane 30 of tempered glass is typically shattered. The shattered glass pieces remain bonded to the films 36 and 38 of the panel 35 which, in turn, remain bonded to the frame 32. The downstanding flange 54 on the outside of the frame 32 prevents the bilaminate window glass from dislodging from the channel 42 and holds it in place. As a result, the bilaminate window glass helps retain the bilaminate window glass in the window opening with respect to the occupant position inside the occupant compartment of the vehicle 10.

The present invention has been described in an illustrative manner. It is to be understood that the terminology which has been used is intended to be in the nature of words of description rather than of limitation.

Many variations and modifications of the present invention are possible in light of the above teachings. Therefore, within the scope of the appended claims, the present invention may be practiced otherwise than as specifically described.

What is claimed is:

1. A vehicle door for an automotive vehicle comprising:

an inner panel;

an outer panel joined to said inner panel and forming a space therebetween;

a bilaminate window glass disposed in the space between said inner panel and said outer panel and comprising at least one pane forming window glass and a frame disposed adjacent about at least a portion of a perimeter of said at least one pane and fixed to said at least one pane; and a channel having a core disposed around a door opening in the automotive vehicle and engaging top and side edges of said bilaminate window glass to form a seal therebetween, said channel having at least one downstanding flange on an outer side of said core spaced from and overlapping an outer side of said frame of said bilaminate window glass for retaining said bilaminate window glass in a window opening of said vehicle door when impacted from inside an occupant compartment of the automotive vehicle.

2. A vehicle door as set forth in claim 1 wherein said downstanding flange is disposed at intervals along top and sides of said channel.

3. A vehicle door as set forth in claim 1 wherein said downstanding flange is continuous along top and sides of said channel.

4. A vehicle door as set forth in claim 1 wherein said bilaminate window glass further comprises a panel bonded to one side of said frame and said at least one pane.

5. A vehicle door as set forth in claim 4 including a bonding cement for bonding said frame and said at least one pane together.

6. A vehicle door as set forth in claim 4 wherein said frame is disposed adjacent about at least three sides of a perimeter of said at least one pane and is made of a non-breakable material.

7. A vehicle door as set forth in claim 4 wherein said at least one pane is made of a tempered glass.

8. A vehicle door as set forth in claim 4 wherein said panel comprises a film of polyvinyl butyral bonded to an inner side of said at least one pane and said frame and a film of polyethylene terephthalate bonded to said film of polyvinyl butyral.

9. A vehicle door for an automotive vehicle comprising:

an inner panel;

an outer panel joined to said inner panel and forming a space therebetween;

a bilaminate window glass disposed in the space between said inner panel and said outer panel, said bilaminate window glass having at least one pane of tempered glass, a non-breakable frame bonded to top and sides of a perimeter of said at least one pane and extending outwardly from the perimeter of said at least one pane, and a panel bonded to one side of said frame and said at least one pane; and a channel disposed around a window opening in the automotive vehicle and engaging top and sides of said bilaminate window glass to form a seal therebetween, said channel having at least one downstanding flange on an outer side thereof spaced from and overlapping an outer side of said frame of said bilaminate window glass.

\* \* \* \* \*